US010632941B2

United States Patent
Chauncey et al.

(10) Patent No.: US 10,632,941 B2
(45) Date of Patent: Apr. 28, 2020

(54) SYSTEMS AND METHODS FOR MEASURING AND REDUCING VEHICLE FUEL WASTE

(71) Applicant: VNOMICS CORP., Pittsford, NY (US)

(72) Inventors: David Charles Chauncey, Fairport, NY (US); Michael David Joseph, Fairport, NY (US)

(73) Assignee: Vnomics Corporation, Pittsford, NY (US)

( * ) Notice: Subject to any disclaimer, the term of this patent is extended or adjusted under 35 U.S.C. 154(b) by 605 days.

(21) Appl. No.: 14/728,646

(22) Filed: Jun. 2, 2015

(65) Prior Publication Data
US 2016/0016525 A1      Jan. 21, 2016

Related U.S. Application Data

(60) Provisional application No. 62/006,590, filed on Jun. 2, 2014.

(51) Int. Cl.
*B60R 16/023* (2006.01)
*F02D 28/00* (2006.01)
(Continued)

(52) U.S. Cl.
CPC ......... *B60R 16/0236* (2013.01); *B60W 50/14* (2013.01); *F02D 28/00* (2013.01);
(Continued)

(58) Field of Classification Search
None
See application file for complete search history.

(56) References Cited

U.S. PATENT DOCUMENTS 4,247,757 A    1/1981   Crump, Jr.
5,089,963 A    2/1992   Takahashi
(Continued)

FOREIGN PATENT DOCUMENTS

| EP | 1498297 | 1/2005 |
|---|---|---|
| EP | 1780393 | 5/2007 |
| GB | 2470147 | 11/2010 |

OTHER PUBLICATIONS

Australian Examination Report dated Feb. 16, 2016 for Australian Application No. 2014277761.
(Continued)

*Primary Examiner* — Christian Chace
*Assistant Examiner* — Kyung J Kim
(74) *Attorney, Agent, or Firm* — Dinsmore & Shohl LLP

(57) ABSTRACT

A method of determining an amount of fuel wasted by a vehicle due to sub-optimal performance of at least one component of the vehicle includes receiving information about operation of the vehicle from at least one sensor positioned on the vehicle, categorizing, with a processor, a fuel use by the vehicle as a normal fuel use or a wasted fuel use due to the at least one component performing at a sub-optimal level by comparing the received information to expected information from the at least one sensor when the vehicle is operating at optimal performance, and determining, with the processor, the amount of fuel wasted due to the at least one component operating at the sub-optimal level based on categorized fuel use.

5 Claims, 12 Drawing Sheets

(51) Int. Cl.
  G07C 5/08 (2006.01)
  G01C 21/34 (2006.01)
  B60W 50/14 (2020.01)
(52) U.S. Cl.
  CPC ....... *G01C 21/3469* (2013.01); *G07C 5/0808* (2013.01); *B60W 2510/0623* (2013.01); *B60W 2530/10* (2013.01); *B60W 2540/30* (2013.01); *B60W 2550/12* (2013.01); *B60W 2550/142* (2013.01); *B60W 2550/22* (2013.01)

(56) References Cited

U.S. PATENT DOCUMENTS

| | | | |
|---|---|---|---|
| 5,315,977 | A | 5/1994 | Fosseen |
| 5,742,922 | A | 4/1998 | Kim |
| 6,092,021 | A | 7/2000 | Ehlbeck |
| 6,208,981 | B1 | 3/2001 | Graf |
| 6,571,168 | B1 | 5/2003 | Murphy |
| 7,386,389 | B2 | 6/2008 | Stolle |
| 7,925,426 | B2 | 4/2011 | Koebler |
| 8,055,439 | B2 | 11/2011 | Ji |
| 8,224,561 | B2 | 7/2012 | Kim |
| 8,498,818 | B1 | 7/2013 | Jones, Jr. |
| 8,793,064 | B2 | 7/2014 | Green |
| 2005/0206508 | A1 | 9/2005 | Lengning |
| 2007/0262855 | A1 | 11/2007 | Zuta |
| 2008/0133120 | A1 | 6/2008 | Romanick |
| 2008/0133121 | A1 | 6/2008 | Sato |
| 2009/0109022 | A1 | 4/2009 | Gangopadhyay |
| 2009/0157290 | A1 | 6/2009 | Ji |
| 2009/0281715 | A1 | 11/2009 | Paik |
| 2010/0265052 | A1 | 10/2010 | Koen |
| 2010/0305819 | A1 | 12/2010 | Pihlajamaki |
| 2011/0145042 | A1 | 6/2011 | Green |
| 2011/0184642 | A1 | 7/2011 | Rotz |
| 2011/0205040 | A1 | 8/2011 | Wiemeersch |
| 2012/0143449 | A1 | 6/2012 | Chauncey |
| 2013/0096895 | A1 | 4/2013 | Willard |
| 2013/0245880 | A1* | 9/2013 | McQuade .............. G07C 5/008 701/32.4 |

OTHER PUBLICATIONS

Notice of Allowance for U.S. Appl. No. 14/551,699, dated May 25, 2016.
Entire patent prosecution history of U.S. Appl. No. 14/551,699, filed, Nov. 24, 2014, entitled, "System and Method for Measuring and Reducing Vehicle Fuel Waste."
International Search Report and Written Opinion issued in corresponding PCT/US2011/063663 dated Jun. 11, 2012.
International Search Report for International Application No. PCT/US2015/033761 dated Oct. 19, 2015.
Written Opinion of the International Searching Authority for International Application No. PCT/US2015/033761 dated Oct. 19, 2015.
Final Office Action dated Dec. 10, 2015 for U.S. Appl. No. 14/551,699.
International Preliminary Report on Patentability and Written Opinion for International Application No. PCT/US2015/033761, dated Dec. 6, 2016, 7 pages.

* cited by examiner

SYSTEMS AND METHODS FOR MEASURING AND REDUCING VEHICLE FUEL WASTE

CROSS-REFERENCE TO RELATED APPLICATIONS

This application claims priority to U.S. Provisional Patent Application No. 62/006,590, filed on Jun. 2, 2014, the contents of which are incorporated fully herein by reference.

FIELD OF THE INVENTION

This invention relates to fuel efficiency of vehicles and to determining fuel-efficient travel routes.

BACKGROUND OF THE INVENTION

Improving fuel efficiency of a variety of vehicles continues to be an important challenge, especially given the role of fossil fuels in both climate change and international relations. Many approaches to different fuels, e.g., biodiesel and electric cars, have been proposed, as have many different engine designs. One previously overlooked area of research is improving the operation of existing vehicles.

The inventors have recognized that there is a need to measure the fuel lost by a vehicle due to suboptimal performance by one or more components of that vehicle. Additionally, the inventors have recognized that there is a need to measure the fuel lost by a vehicle due to the application of excessive horsepower and torque beyond the minimum amount of horsepower and torque necessary to move the vehicle along its route. Further, the inventors have recognized that it would be desirable to select a vehicle and a route of travel between a departure and a destination that optimizes fuel economy.

SUMMARY OF THE INVENTION

Aspects of the invention relate to methods of and systems for determining an amount of fuel wasted by a vehicle due to sub-optimal performance of at least one component of the vehicle; determining fuel use of a vehicle for at least one segment of a route of travel; optimizing a traveling route of a vehicle between a departure and a destination based on fuel consumption; and determining a fuel economy associated with a minimum amount of horsepower and torque to move a vehicle across at least one segment of a traveling route.

In accordance with one aspect, the invention provides a method of determining an amount of fuel wasted by a vehicle due to sub-optimal performance of at least one component of the vehicle. The method includes receiving information about operation of the vehicle from at least one sensor positioned on the vehicle; categorizing, with a processor, a fuel use by the vehicle as a normal fuel use or a wasted fuel use due to the at least one component performing at a sub-optimal level by comparing the received information to expected information from the at least one sensor when the vehicle is operating at optimal performance; and determining, with the processor, the amount of fuel wasted due to the at least one component operating at the sub-optimal level based on the categorized fuel use.

In accordance with another aspect, the invention provides a method of determining fuel use of a vehicle for at least one segment of a route of travel. The method includes determining one or more vehicle characteristics of the vehicle, the vehicle characteristics including at least one of a vehicle profile or a vehicle load; determining one or more segment characteristics of the at least one segment, including at least one of a slope, government imposed traffic controls, volume of traffic, or weather conditions; and determining, with a processor, a fuel economy for the vehicle relating to the at least one segment as a function of the one or more vehicle characteristics and the one or more segment characteristics.

In accordance with yet another aspect, the invention provides a method of optimizing a traveling route of a vehicle between a departure and a destination based on fuel consumption. The method includes determining one or more vehicle characteristics of the vehicle, the vehicle characteristics including at least one of a vehicle profile or a vehicle load; determining one or more segment characteristics of each of a plurality of segments between the departure and the destination, the segment characteristics including at least one of a slope, government imposed traffic controls, volume of traffic, or weather conditions for the at least one segment; determining, with a processor from the one or more vehicle characteristics and the one or more segment characteristics, a fuel use for the vehicle relating to each segment in the plurality of segments between the departure and the destination; determining, with the processor, an optimized traveling route by identifying a combination of segments between the departure and the destination providing the lowest level of fuel use for the vehicle as the optimized traveling route; and presenting the optimized traveling route.

In accordance with still yet another aspect, the invention provides a method of determining a fuel economy associated with a minimum amount of horsepower and torque to move a vehicle across at least one segment of a traveling route. The method includes sensing information about the operation of the vehicle from at least one sensor positioned on the vehicle, the information including a current amount of horsepower and torque; determining one or more vehicle characteristics of the vehicle, the vehicle characteristics including at least one of a vehicle profile or a vehicle load; determining one or more segment characteristics of the at least one segment, the segment characteristics including at least one of a slope, government imposed traffic controls, volume of traffic, or weather conditions; determining, with a processor, a minimum amount of horsepower and torque to move the vehicle across the at least one segment as a function of the one or more characteristics of the vehicle and the one or more characteristics of the at least one segment; comparing the current amount of horsepower and torque with the determined minimum amount of horsepower and torque; and calculating, with the processor, a wasted amount of fuel based on the difference between the current amount of horsepower and torque and the determined minimum amount of horsepower and torque.

In accordance with other aspects, the invention provides a system for determining an amount of fuel wasted by a vehicle due to sub-optimal performance of at least one component of the vehicle. The system includes at least one sensor configured to detect fuel use information of a vehicle during operation of the vehicle, and a controller. The controller may include a categorization module configured to obtain the fuel use information from the at least one sensor for each time frame in a series of time frames and to categorize the fuel use information for each time frame into either at least one of a plurality of normal fuel use categories or at least one of a plurality of wasted fuel categories, wherein the plurality of wasted fuel categories includes at least one category for fuel wasted due to the at least one component of the vehicle operating at a sub-optimal level and at least one category for fuel wasted due to excessive horsepower or excessive torque. The controller may also include a determination module configured to subtract a total amount of fuel used during each time frame in the series of time frames where the fuel use information is categorized in the plurality of wasted fuel categories from a total amount of fuel used over the series of time frames for storage in the data storage device as the minimum amount of fuel required for the series of time frames.

In still another aspect, the invention provides a system for determining fuel use of a vehicle for at least one segment of a route of travel. The system includes at least one sensor configured to sense one or more vehicle characteristics of the vehicle including at least one of a vehicle profile or a vehicle load, a database comprising information regarding one or more segment characteristics of the at least one segment, including at least one of a slope, government imposed traffic controls, volume of traffic, or weather conditions, and a controller. The controller may include a determination module configured to determine a fuel economy for the vehicle relating to the at least one segment by comparing the one or more vehicle characteristics sensed by the at least one sensor to corresponding information in the database.

In yet another aspect, the invention provides a system for optimizing a traveling route of a vehicle between a departure and a destination based on fuel consumption. The system includes at least one sensor configured to sense one or more vehicle characteristics of the vehicle including at least one of a vehicle profile or a vehicle load, a database comprising information regarding one or more segment characteristics of each of a plurality of segments between the departure and the destination, the segment characteristics including at least one of a slope, government imposed traffic controls, volume of traffic, or weather conditions, and a controller. The controller may include a determination module configured to determine a fuel economy for the vehicle relating each of a plurality of segments by comparing the one or more vehicle characteristics sensed by the at least one sensor to corresponding information in the database regarding the one or more segment characteristics of each of a plurality of segments. The controller may also include a mapping module configured to identify, from the plurality of segments, a combination of one or more segments between the departure and the destination providing an optimized fuel economy and configured to present an optimized traveling route comprising the combination of one or more segments between the departure and the destination providing an optimized fuel economy.

In another embodiment, the invention provides a method of selecting a vehicle for a particular route. The method includes dividing a route of travel into a plurality of segments; identifying a segment characteristic of each of the plurality of segments; determining, with a processor, a fuel use for each of a plurality of vehicles moving across the segments, the fuel use dependent upon the segment characteristic; selecting, with the processor, from the plurality of vehicles, a vehicle having a relative optimized fuel economy for the plurality of segments by comparing the determined fuel use of each vehicle; and presenting information regarding the vehicle having a relative optimized fuel economy.

In still another embodiment, the invention provides a method of optimizing a vehicle having an engine control unit programmed with a first vehicle profile for a route of travel. The method includes dividing a route of travel into a plurality of segments; identifying a segment characteristic of each of the plurality of segments; determining, with a processor, a second vehicle profile, the second vehicle profile dependent upon one or more of a fuel use and the segment characteristics; and reprogramming the engine control unit with the second vehicle profile.

In yet another embodiment, the invention provides a method of determining a load weight of a vehicle. The method includes sensing information about the operation of the vehicle from at least one sensor positioned on the vehicle, the information including an acceleration of the vehicle; determining, with a processor, an amount of energy used by the vehicle for the acceleration dependent upon a vehicle profile of the vehicle and the acceleration; and determining, with a processor, the load weight dependent upon the amount of energy and the vehicle profile.

In still another embodiment, the invention provides a system for optimizing a traveling route of a vehicle between a departure and a destination based on fuel consumption. The system includes a database having information regarding one or more vehicle characteristics of the vehicle including at least one of a vehicle profile or a vehicle load weight sensed by at least one sensor and regarding one or more segment characteristics of each of a plurality of segments between the departure and the destination, the segment characteristics including at least one of a slope, government imposed traffic controls, volume of traffic, or weather conditions. The system also includes a controller. The controller includes a determination module configured to determine a fuel economy for the vehicle relating each of a plurality of segments by comparing the one or more vehicle characteristics sensed by the at least one sensor to corresponding information regarding the one or more segment characteristics of each of a plurality of segments. The controller further includes a mapping module configured to identify, from the plurality of segments, a combination of one or more segments between the departure and the destination providing an optimized fuel economy and configured to present an optimized traveling route comprising the combination of one or more segments between the departure and the destination providing an optimized fuel economy.

BRIEF DESCRIPTION OF THE DRAWINGS

The invention is best understood from the following detailed description when read in connection with the accompanying drawings, with like elements having the same reference numerals. When a plurality of similar elements is present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 4b is a flow diagram illustrating a method for determining a combination of segments having the lowest level of fuel use for use in the method illustrated in FIG. 4a;

DETAILED DESCRIPTION OF THE INVENTION

Figure 1A:
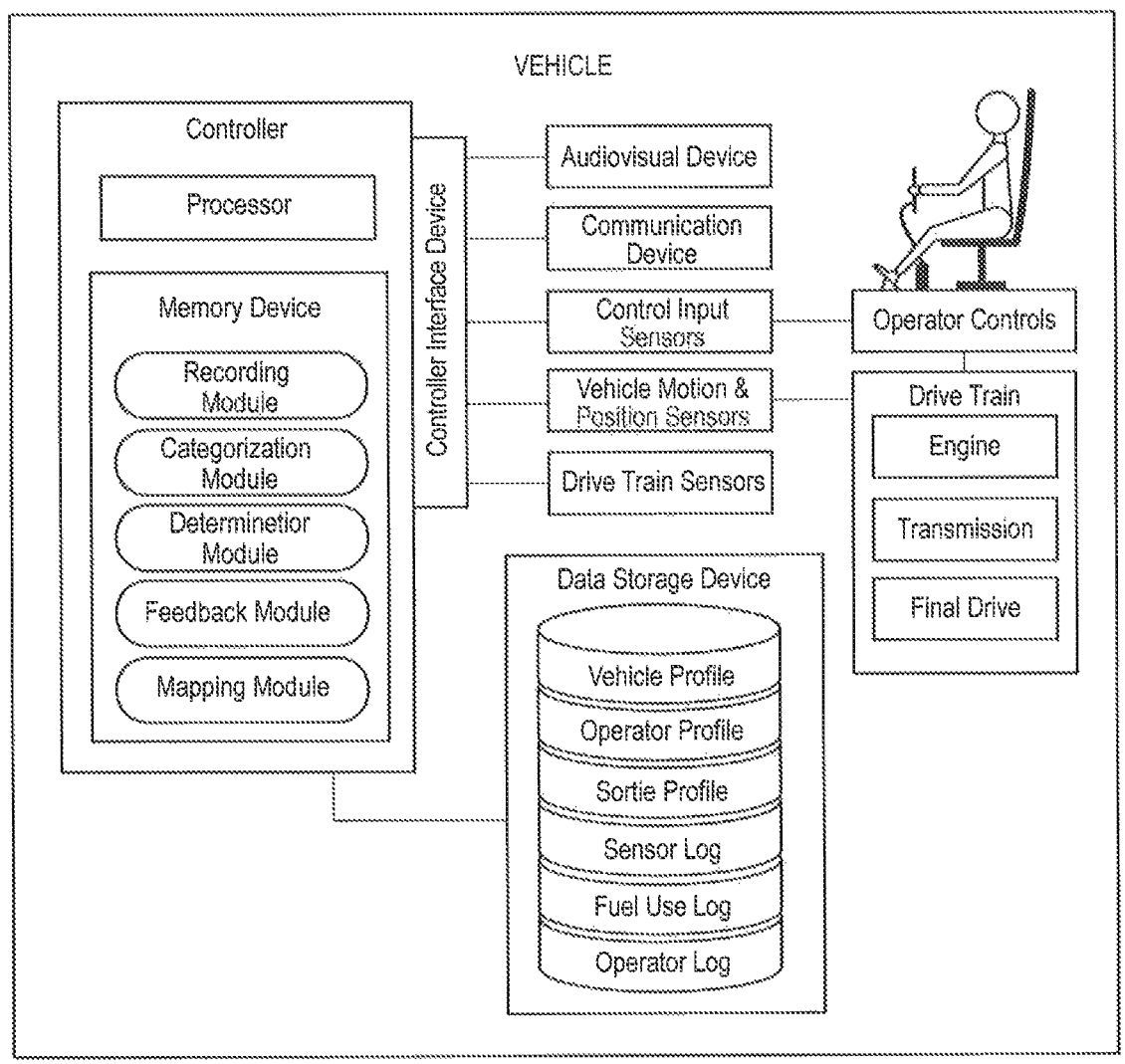
FIG. 1a is a block diagram illustrating a system for optimizing fuel use in accordance with aspects of the present invention.

Aspects of the invention are directed to methods of and systems for measuring the fuel used by a vehicle during a sortie, determining the amount of fuel wasted, selecting travel routes optimized for the fuel economy of a particular vehicle, and selecting vehicles having the best relative fuel economy for traveling a particular route.

As used herein, "vehicle" means any type of transport having an engine (e.g., a piston engine, a diesel engine, a rotary engine, an electric motor, or turbine engine) that propels the vehicle by consuming fuel. An exemplary vehicle, used to illustrate several principles of the invention, is a tractor-trailer carrying commercial freight. This disclosure is not so limited, however, and is also directed to other vehicles such as ground vehicles (e.g., gasoline or hybrid), watercraft, aircraft, or remote controlled vehicles.

As used herein, "fuel" means any energy source that the engine consumes to propel the vehicle and operate auxiliary equipment. Generally the fuel used by the vehicle is a combustible material, such as gasoline, kerosene, diesel fuel, hydrogen, natural gas, propane, and/or ethanol. One of ordinary skill in the art will understand that other fuels, whether combustible, chemical, electrochemical, biological, solar, photovoltaic, nuclear, kinetic, and potential energy source, are also envisioned, are within the scope of the instant invention.

As used herein, "route of travel" or "traveling route" each relate to a road, course, or way of travel used by a vehicle to move from a departure to a destination. As one of ordinary skill in the art will understand, multiple discrete traveling routes may be used to move a vehicle from a departure to a destination. Further, each route of travel may be further broken down into a series of continuous segments.

As used herein, "driver" or "operator" refers to the individual or hardware/software module that controls the vehicle, either onboard or remotely, during a sortie and whose behavior may affect the amount of fuel consumed by the vehicle. One of ordinary skill in the art will understand that the methods and systems described herein can be applied to manually controlled vehicles as well as autonomous, autonomous assist, semi-autonomous, or unmanned vehicles while still remaining within the scope of the present invention.

As used herein, "sortie" refers to the period or route of travel between the start of a trip at an origin location (i.e., the departure) and the location at the end of the trip (i.e., the destination) for a particular vehicle. The "start" and the "end" of a sortie may correspond to an operator-input, a time event and/or a position event. For instance, an operator-input event may be a command input (e.g., a pushbutton) from the operator of the vehicle. Time events may include all the activities of the vehicle within a time period (e.g., 7:00 AM to 7:00 PM). Position events may define the start of a sortie when a vehicle embarks from a first location (e.g., a start line) and/or at the end of a sortie when the vehicle arrives at a second location (e.g., a finish line). The first and second locations may be the same when the vehicle completes a round-trip.

As used herein, "fuel economy" refers to the fuel efficiency relationship between distance traveled by a vehicle and the amount of fuel consumed. An optimized fuel economy, therefore, refers to a maximized distance traveled per amount of fuel consumed.

Generally, aspects of the invention address fuel waste which can occur from: (1) fuel waste attributable to actions by the operator and/or (2) fuel waste independent of the operator's actions. Regarding the first category, ideally, the operator would not waste any fuel. That is, the operator would use the minimum amount of fuel necessary during the sortie. However, during a sortie, an operator may waste fuel due to poor driving technique (e.g., changing gears at the wrong time or traveling at excessive speeds), excessive idling (e.g., failing to turn the vehicle off during long stops) or high-idling (any vehicle use that leads to an altered and less than optimal fuel map due to, e.g., higher energy requirements or RPMs). Also, fuel may be wasted if the vehicle is not properly configured, such as in the case where a vehicle is setup for making heavy haul deliveries performs a sortie requiring a large number of light deliveries in stop-and-go conditions.

The operator may also waste fuel by operating the vehicle using more horsepower and torque than the minimum amount required to move the vehicle along a route of travel. Moving the vehicle along a particular route of travel requires a certain amount of horsepower and torque in order to overcome forces upon the vehicle including friction, gravity, and aerodynamic drag. The minimum amount of horsepower and torque also depends upon, e.g., characteristics of the route of travel including terrain, distance, weather conditions and government imposed traffic controls. One example of potentially wasteful vehicle operation in this regard is when an operator follows another vehicle too closely, resulting in unnecessary speed changes and excessive horsepower and torque.

The operator may also select a route of travel which results in greater fuel use than other routes of travel that may be used to move the vehicle from the departure to the destination. For example, one route of travel may have route characteristics that cause greater fuel waste when compared to other routes of travel having different route characteristics. Route characteristics which may contribute to fuel waste include terrain, distance, weather conditions and government imposed traffic controls.

Similarly, the operator may select a vehicle having a suboptimal fuel economy for a given route of travel. When considering the vehicle profile (e.g., vehicle type, mechanical operating condition, transmission type, engine type including horsepower and torque ratings, fuel type, and carrying capacity including load weight, length, and height), a particular vehicle may have a suboptimal fuel economy (as compared to other available vehicles) for traversing a given route of travel.

Fuel waste may also occur as a result of the mechanical operating condition of the vehicle, which is independent of the operator's control of the vehicle. In particular, fuel waste may occur as the result of one or more components of the vehicle performing at a suboptimal level. For example, an improperly functioning fuel delivery system (e.g., stuck fuel injector, worn fuel pump), emission control system (e.g., stuck exhaust gas recirculation valve, plugged diesel particulate filter), or other component can result in lost fuel.

FIG. 1a is a block diagram illustrating an exemplary vehicle in which embodiments consistent with the present disclosure may be implemented. The vehicle may include operator controls, a drive train, sensor devices, an audiovisual device and a communication device.

The operator controls are components of the vehicle that receive inputs from the operator that affect the vehicle's fuel consumption. The operator's controls may include, for example, steering inputs (e.g., steering wheel, stick, yoke), breaking inputs, trim inputs, throttle inputs and transmission inputs (e.g. gear selection).

The drive train includes vehicle components that transform fuel into kinetic energy to propel the vehicle. The drive train may include an engine, a transmission, and a final drive (e.g., drive wheels, continuous tracks, propeller, etc.).

Sensors are devices that measure or detect real-world conditions and convert the detected conditions into analog and/or digital information that may be stored, retrieved and processed. As shown in FIG. 1, the vehicle's sensors include control input sensors, vehicle position/motion sensors, and drive train sensors. One of ordinary skill in the art will be aware of other relevant sensors, such as those for sensing mass air flow rate, turbo boost pressure, etc. The control input sensors detect and/or measure changes in the state of the control input devices.

The vehicle motion/position sensors detect and/or measure the vehicle's position, orientation, velocity, acceleration and changes in the state thereof. The motion/position sensors may include accelerometers that measure acceleration (translational or angular). Based on the vehicle's acceleration in any direction over time, its speed and position can be derived. In some embodiments, some or all of the motion/position sensors are provided by an inertial measurement unit (IMU), which is an electronic device that measures and reports on a vehicle's velocity, orientation and gravitational forces, using a combination of accelerometers and/or gyroscopes without the need for external references. Additionally, the motion/position sensors may be provided by a global positioning system (GPS) navigation device. GPS devices provide latitude and longitude information, and may also calculate directional velocity and altitude. The vehicle may also include speed sensors that detect the speed of the vehicle. Based on the speed, the sensor may also detect the distance traveled by the vehicle (e.g., odometer). Additionally or alternatively, wheel speed sensors may be located on the wheels, the vehicle's differential, or a pilot tube may measure the velocity of air with respect to the motion of the vehicle. Sensors external to the vehicle (e.g., sensors located on other roadway objects separate from the vehicle, such as "connected" bridges or traffic signals) may similarly measure and transmit vehicle information.

The drive train sensors include devices that determine operating parameters of the engine and transmission. For example, the drive train sensors may detect engine speed (e.g., RPM), horsepower, torque, air flow, fuel flow, oxygen, use of auxiliary equipment, and idle speed. Based on this information, the vehicle's fuel consumption may be determined at any given time. This information may also be used to determine, e.g., a current horsepower and torque for the vehicle. The drive train sensors may also indicate whether a vehicle component, such as a component of the fuel delivery system, emission control system or other component is functioning at a suboptimal level.

The audiovisual device generates visual and aural cues to present the operator with feedback, and coaching. The audiovisual device may include a video display, such as a liquid crystal display, plasma display, cathode ray tube, and the like. The audiovisual device may include an audio transducer, such as a speaker. Furthermore, the audiovisual display may include one or more operator-input devices, such as bezel keys, a touch screen display, a mouse, a keyboard and/or a microphone for a voice-recognition unit. Using the audiovisual device, information obtained from the vehicle's sensors may be used to provide feedback to the operator indicating driving actions or navigational instructions that should have been taken or avoided to optimize fuel consumption by the vehicle. The audiovisual device may also be configured to provide the same or similar feedback to autonomous or unmanned vehicles.

The communication device sends and/or receives information from the vehicle over one or more communication channels to other vehicles, one or more communication channels to external sensor sources (e.g., sensors located on external infrastructure devices, traffic management devices, etc.), a remote supervisor, and/or a remote server (not shown). The communication device may provide, for example, information collected by the sensors and reports generated by the fuel tracking system describing fuel use, fuel wasted, operator performance and vehicle performance to a back-office server (not shown).

The communication device may use wired, fixed wireless, or mobile wireless information networks that communicate a variety of protocols. The networks may comprise any wireless network, wireline network or a combination of wireless and wireline networks capable of supporting communication by the vehicle using ground-based and/or space-based components. The network can be, for instance, an ad-hoc wireless communications network, a satellite network, a data network, a public switched telephone network (PSTN), an integrated services digital network (ISDN), a local area network (LAN), a wide area network (WAN), a metropolitan area network (MAN), all or a portion of the Internet, and/or other communication systems or combination of communication systems at one or more locations. The network can also be connected to another network, contain one or more other sub-networks, and/or be a sub-network within another network.

The controller may be one or more devices that exchange information with the sensors, the memory device, the data storage device, the audiovisual device and/or the communication device. The controller includes a processor and a memory device. The processor may be a general-purpose processor (e.g., INTEL or IBM), or a specialized, embedded processor (e.g., ARM). The memory device may be a random access memory ("RAM"), a read-only memory ("ROM"), a FLASH memory, or the like. Although the memory device is depicted as a single medium, the device may comprise additional storage media devices.

In some embodiments, the controller is a stand-alone system that functions in parallel with other information processing devices (e.g., a mission computer, engine control unit, cockpit information unit, and/or autonomous driving unit) operating on the vehicle. In other embodiments, the functions of the controller may be incorporated within one or more other information processing devices on the vehicle. In certain embodiments, the controller or certain of its components may be external to the vehicle (e.g., at a location remote to the vehicle). As described in more detail below, the controller may be configured to perform some or all of the functionality described herein.

The controller processes the received information to determine the amount of fuel required for the vehicle during a sortie, the amount of fuel required for a vehicle moving across a particular route of travel during the sortie, the amount of fuel required for a vehicle moving across a segment of a particular route of travel, and the amount of fuel wasted during the sortie. The controller may also identify a particular route of travel as resulting in the least amount of fuel waste consumed relative to other potential routes of travel. The determinations made by the controller may be output via the audiovisual device to provide feedback and/or operator coaching. In one embodiment, the controller provides determinations in the form of navigational instructions to the operator for a route of travel that is more fuel efficient than other potential routes of travel. In addition, the determinations may be reported to a supervisor or a back-office server via the communication device.

The data storage device may be one or more devices that store and retrieve information, including computer-readable program instructions and data. The data storage device may be, for instance, a semiconductor, a magnetic or an optical-based information storage/retrieval device (e.g., flash memory, hard disk drive, CD-ROM, or flash RAM).

The controller interface device may be one or more devices for exchanging information between the host and the devices on the vehicle. The controller interface device may include devices operable to perform analog-to-digital conversion, digital-to-analog conversion, filtering, switching, relaying, amplification and/or attenuation. Furthermore, the controller interface device may store the received information for access by the processor. In some embodiments, the data interface includes a diagnostic data port, such as OBDII (On-board diagnostics II) or a J1708/J1939 bus interface as described in the Society of Automotive Engineers SAE International Surface Vehicle Recommended Practice.

The computer-readable program instructions may be recorded on the data storage device and/or the memory device. As shown in FIG. 1a, the instructions include a recording module, a categorization module, a determination module, a feedback module, and a mapping module. The recording module configures the controller to obtain information provided to the controller by the sensors and stores the sensor information in the data storage device. The categorization module configures the controller to categorize the amount of fuel used during the sortie based on information received from the sensors and control inputs. The determination module obtains information from the fuel-use log and determines the amount of fuel used during all or a portion of the sortie, the amount of fuel wasted, and the minimum amount of fuel required to complete all or a portion of the sortie. The mapping module identifies one or more routes of travel between a departure and a destination. The mapping module may further break down each route of travel into a plurality of continuous segments of the route of travel. In one embodiment, the mapping module is remote to the vehicle, e.g., in a back-office server, and may transmit a calculated route to the vehicle.

The data stored on the data storage device includes a vehicle profile, an operator profile, and/or a sortie profile. The vehicle profile includes information describing the configuration and predetermined limits of the vehicle. For instance, the vehicle profile may include a vehicle identifier, a vehicle type, a make, a model, vehicle options, vehicle age, defects, maintenance history and predetermined limitations (e.g., road speed limit). In addition, the vehicle profile may store information about the engine, such as the engine type, size, power, power curve, torque curve and idle speed. Also, the vehicle profile may store information about the drivetrain, such as gear ratios, wheel size, threshold speeds, optimal engine speed for the gears in the transmission, and/or a map of the ideal shift patterns and/or throttle position for the transmission including considering various forms of shifting gears such as manual, manual assist, automatic, and automated manual (AMT) etc. given the conditions the vehicle is being operated under. Additionally, the profile includes a variety of information including specifics about the vehicle and the vehicle load and how each affects fuel economy. As used herein, "vehicle load" and "vehicle load weight" refer broadly to both the laden and unladen weight of the vehicle.

The operator profile stores information describing the operator including identification information, experience information, skill-rating information, performance information and goal information. The operator profile may also store information regarding autonomous, autonomous assist, semi-autonomous, or unmanned operation.

The sortie profile stores information corresponding to a sortie. The sortie profile information may include a sortie type, a sortie description and a load description. In addition, the sortie profile may include thresholds corresponding to the sortie, such as speed, distance, time, stops and load. Furthermore, the sortie type may include information describing the sortie, including, the environment of the sortie (e.g., urban, suburban, rural, long-haul, infrastructure devices such as bridges and traffic signals, combat, enforcement, patrol, or training) along with corresponding performance thresholds. Sortie type information may be stored in a database for later use in the sortie profile, or it may be obtained in real time via a third party information provider. Exemplary third party information providers include companies such as TrafficLand of fax, VA (traffic reporting), Global Weather Corp. of Boulder, Colo. (weather reporting), and Navteq of Chicago, Ill. (mapping services). In addition, the sortie description may include a plurality of predefined routes, waypoints and schedules for the sortie. A load type may include, for example, descriptors of the load including size, weight, scheduled delivery time, fragility and/or hazardous material identifiers.

The data storage device may store logs of information generated during the sortie. This information may include a sensor log, a fuel-use log and an operator log. The sensor log receives information from the sensors and stores the information in association with a corresponding time frame. A time frame is a block of time that is one of a series that span the duration of the sortie. The length of the time and the rate at which the time frames are recorded may be chosen to provide different levels of detail regarding the vehicle's fuel-use and the operator's performance. In some embodiments, a substantially continuous sequence of fuel-use determinations is recorded in the fuel-use log. For instance, the recording may determine a category of fuel-use for each time frame during the sortie. The time frame may be, for example, 1/60th of second, one-second, ten-seconds, etc. Other embodiments may, for example, make periodic samples. The recording may record a fuel-use determination every ten seconds based on a one-second time frame. One of ordinary skill in the art will understand the aforementioned time frames to be exemplary, and not limiting, and that other time frames (either shorter or longer) will fall within the scope of the present invention.

The fuel-use log is a record of the fuel-used by the vehicle during a sortie. As described below, the controller determines the amount of fuel used and the fuel wasted during a sortie. The fuel used and the fuel wasted is determined based on categorizing the fuel used within a number of fixed and/or variable length time frames during the sortie.

Figure 1B:
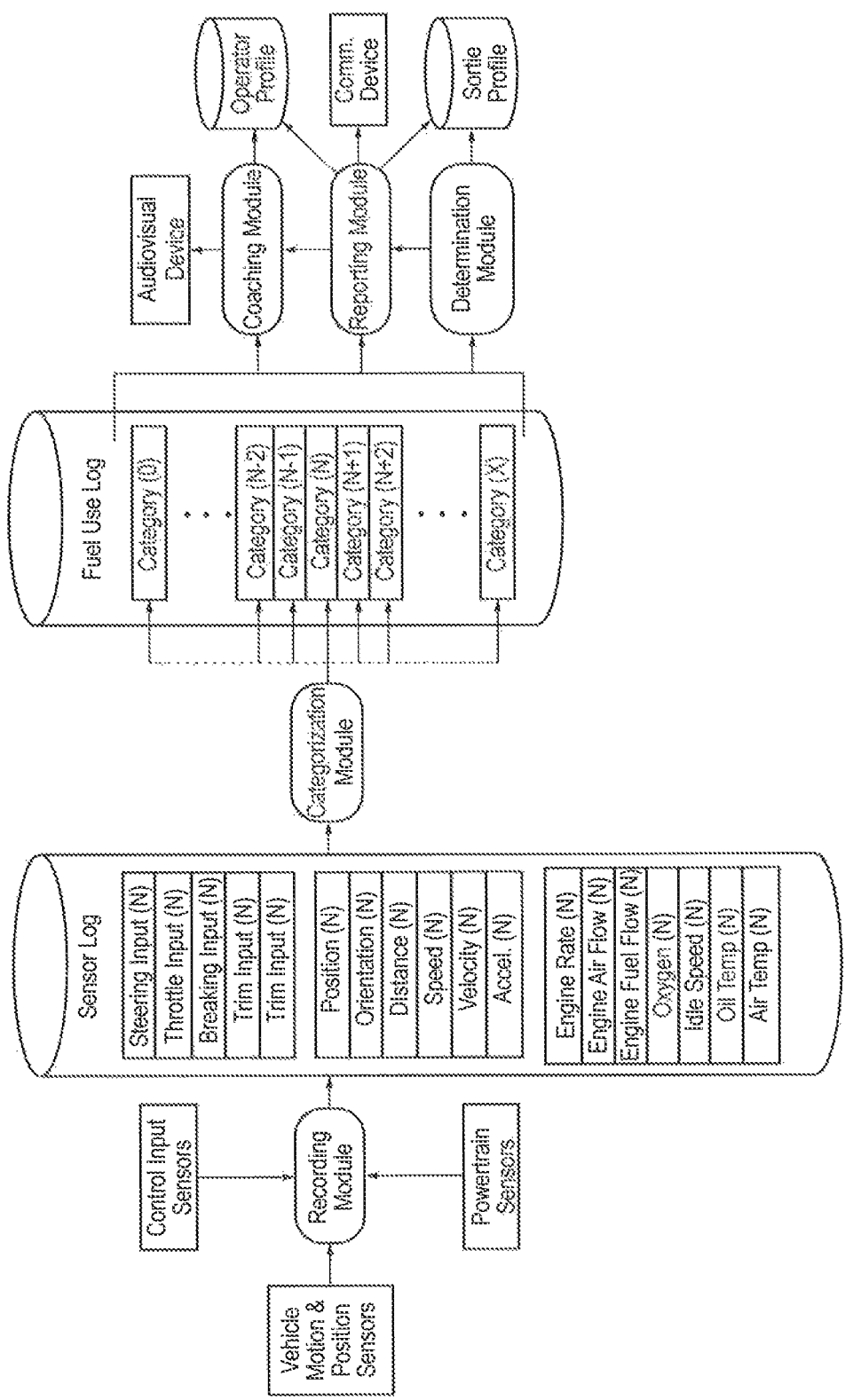
FIG. 1b is a functional diagram of a system for optimizing fuel use in accordance with aspects of the present invention.

FIG. 1b is a functional block diagram of the exemplary vehicle illustrated in FIG. 1a. The recording module, when executed by the processor, configures the controller to obtain information from the vehicle's sensors over a time frame (N) and store the sensor information as a record in the sensor log identified to the corresponding time frame (N), where "N" represents a current time frame in a series of time frames [0 . . . N . . . X], where "0" represents the first recorded time frame during the sortie, "N" represents the current time frame, and "X" represents the final time frame recorded at the end of the sortie. For the sake of clarity, FIG. 1b only shows the sensor information recorded for a single, current time frame (N). The same or similar information may be recorded and stored in the sensor log for each time frame 0 to X. In some embodiments, all the sensor information from each time frame may be retained in the sensor log. In other embodiments, a subset of the sensor information is retained. For example, to reduce the size of the data storage device, the sensor log may function as a buffer that stores only the latest several time frames (e.g. N−2, N−1, and N).

The categorization module, when executed by the processor, configures the controller to obtain sensor information stored in the sensor log for a time frame and, based on the sensor information, categorize the fuel used in that time frame into one of a plurality of categories. The category information is stored in the fuel-use log identified with the corresponding time frame (0 . . . N . . . X). The categories include a number of categories that identify different wasteful uses of fuel (e.g., high-idle, excessive idle, excessive speed, gearing, improper progressive shift, excessive horsepower and/or torque, and suboptimal performance of one or more components of a vehicle) and at least one category corresponding to non-wasteful uses of fuel (e.g., normal fuel use or a desired stop).

The determination module, when executed by the processor, configures the controller to determine how much fuel was consumed beyond what would have been used by best practices or by a vehicle having optimally performing components based on information recorded in the fuel-use log. The cumulative amount of fuel wasted during the sortie may be determined by totaling the fuel categorized as wasted in the time frames 0 to N. Additionally, the fuel wasted over the entire sortie may be determined by totaling the fuel used for each time frame categorized as wasted in the time frames 0 to X. Furthermore, the minimum amount of fuel required during the sortie may be determined by subtracting the cumulative amount of fuel wasted from the cumulative fuel used during the sortie.

The reporting module, when executed by the processor, configures the controller to obtain information from the fuel-use log and/or the determination module to generate a report of the vehicle's and the operator's performance during the sortie. The reporting module may generate a document including the information in the report and provide the information to, for example, the communication device for transmission to the operator's supervisor and/or back office server. The reporting module may also share information with the feedback module. Additionally, the reporting module may modify and/or update route segment characteristics, which characteristics are described below, for use in future calculations.

The feedback module, when executed by the processor, configures the controller to obtain information from the fuel-use log and/or the reporting module. Based on the obtained information, the feedback module may generate visual and aural cues for the operator using the audiovisual device. For instance, the feedback module may generate a horsepower and torque score that is calculated and displayed to the operator by the audiovisual device and/or transmitted to the operator's supervisor via the communication device. The feedback module may also determine an operator's performance score based on the results generated by the categorization module and the determination module. The score may also be used to compare performance relative to other operators in a group. The feedback module may also generate visual and aural navigational instructions (or machine-to-machine instructions, in the case of autonomous, autonomous assist, semi-autonomous, or unmanned vehicles) directing the operator to move the vehicle across a fuel efficient route of travel. The feedback module may also provide an indication that maintenance is required for one or more components of the vehicle that are operating at a suboptimal level and, thereby, contributing to fuel waste.

Figure 1C:
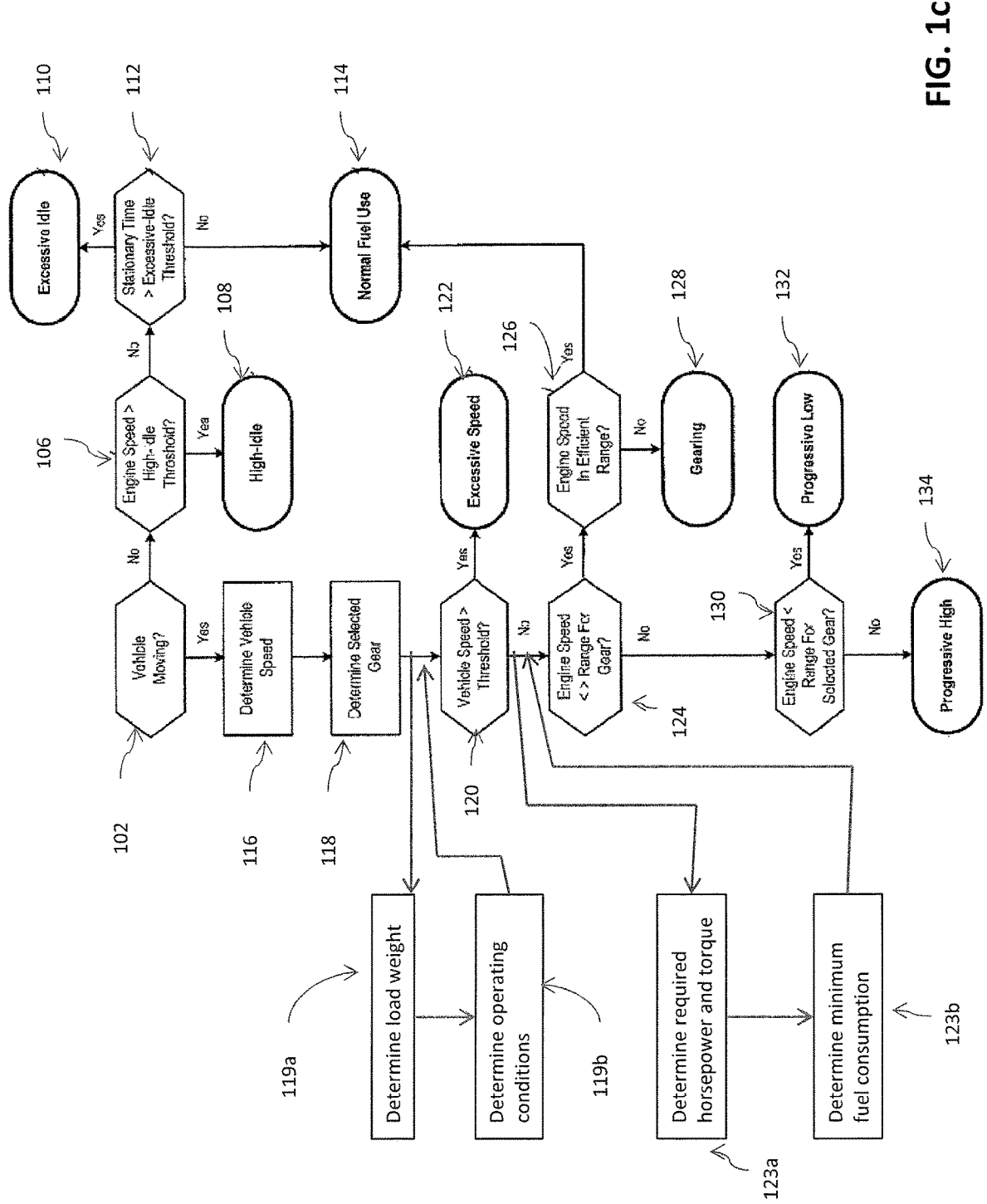
FIG. 1c is a flow diagram illustrating a process of categorizing fuel use in accordance with aspects of the present invention.

FIG. 1c is a flow chart illustrating an exemplary process by which the categorization module categorizes fuel-use. It will be understood from the description herein that one or more steps of the methods and processes described herein may be omitted and/or performed out of the described sequence while still achieving desired results in accordance with aspects of the invention.

The amount of fuel wasted during the sortie is determined from the categorization of a vehicle's fuel use based on information received from the vehicle's sensors. The categories correspond to conditions of the vehicle caused by the operator and/or vehicle configuration. The categories include excessive horsepower, torque, idle, high idle, gearing, improper gear selection (e.g., high/low progressive shifting) and excessive speed. By determining the amount of fuel allocated to these categories during and/or after a sortie, the system may determine the least amount of fuel required during the sortie. Based on this, a fleet manager may determine the operating cost of the fuel for a sortie absent any waste. Additionally it may determine for the fleet manager the cost of his/her operators' inefficient behaviors.

The module depicted in FIG. 1c first determines whether the vehicle is moving. (Step 102) This determination may be made based on information received from the vehicle motion & position sensors (e.g., accelerometer, INS, GPS).

If the vehicle is not moving (step 102, "No"), the categorization module determines whether the engine speed is below the high-idle threshold value (step 106) using information received from the drive train sensors (e.g., tachometer). As used herein, "high-idle threshold" means that the power takeoff ("PTO") is engaged. The categorization module may obtain this information from, e.g., a direct reading of the PTO engagement from the data bus, installed sensors, or direct communication with the auxiliary device being driven. If the PTO is engaged (step 106, "Yes"), the categorization module stores the fuel wasted due to running auxiliary equipment in the fuel use log in association with the current time frame (step 108). The categorization module (step 108) may also receive information from the vehicle data bus or external sensors to determine that the PTO is engaged. The amount of fuel wasted may be determined based on the difference between the measured fuel flow at the engine speed during the current time frame and the fuel flow rate at the high-idle threshold. The fuel flow rate at the high-idle threshold may be determined based on engine speed information stored in the sensor log, or it may be determined based on a predetermined fuel flow rate stored in the vehicle profile.

If the vehicle is not moving (step 102, "No"), and the engine speed is not greater than the high-idle threshold value (step 106, "No"), the categorization module determines whether the vehicle has been stationary for a continuous period of time that exceeds the excessive-idle threshold value (step 112). If not (step 112, "No"), the categorization module records the fuel used during the current time frame in the current time frame as normal fuel-use (step 114). Otherwise, if the vehicle has been stationary for a continuous period of time that exceeds the excessive-idle threshold value (step 112, "Yes"), the categorization module records any amount of fuel used for the time period exceeding the excessive-idle threshold in the category of "excessive idle" (step 110).

If the categorization module determines that the vehicle is moving (step 102, "Yes"), the module determines the vehicle's speed (step 116) and the selected gear of the transmission (step 118), based on information received from the vehicle motion and position sensors and the drive train sensors. The module next determines the vehicle's load weight (step 119a), based on information received from the vehicle motion and position sensors and the drive train sensors.

The load weight may be calculated based on energy used during vehicle acceleration, compensating for rolling resistance, aerodynamic drag, and elevation changes associated with traversing a given segment of a route of travel. In particular, one of ordinary skill in the art will understand that the force or power required to propel a vehicle at any moment in time is customarily presented as a "road load equation." The equation for determining force has four terms to describe tire rolling resistance, aerodynamic drag, acceleration, and grade effects:

$$F_{RL} = mgC_{rr} + 0.5C_D A \rho_a V^2 + m(dV/dt) + mg \sin(\theta)$$

where mg is vehicle weight, $C_{rr}$ is tire rolling resistance, A is the frontal area, $C_d$ is a drag coefficient based on the frontal area, $\rho_a$ is the air density, V is the vehicle velocity, m is vehicle mass, t is time, and $\sin(\theta)$ is the road gradient (uphill positive). Neither $C_D$ nor $C_{rr}$ need be constant with respect to speed, and the term $C_D A$ should not be split without careful thought.

For road load power, the force equation is multiplied by velocity:

$$P_{RL} = mgC_{rr}V + 0.5C_D A \rho_a V^3 + mV(dV/dt) + mg \sin(\theta)V.$$

In conventional vehicles the road load power is supplied by an engine, via a transmission and one or more drive axles characterized by an efficiency ($\eta$). The engine may also supply power for auxiliary loads (Paux), including cooling fan loads, so that a simple engine power demand (PE) model is given by:

$$P_E = \frac{P_{SL}}{\eta} + P_{aux}$$

The force $F_{RL}$ may become negative while the vehicle is decelerating or traveling on a sufficiently steep downgrade, with "negative" power being absorbed through engine braking or friction brakes. For hybrid-drive vehicles, some of the "negative" power may be absorbed and stored for use in future propulsion of the vehicle. Since hybrid vehicles have at least two sources of power during part of their duty cycle, the engine power demand model must be adjusted to account for the flow of power to or from other sources during operation.

In one embodiment according to the present invention, the load weight may be calculated based on energy used during vehicle acceleration, compensating for rolling resistance, aerodynamic drag, and elevation changes associated with traversing a given segment of a route of travel. The algorithm used calculates the acceleration during a period of time based on the rate of change in velocity. The fuel rate is integrated over that same period of time to determine the total energy consumed. The change in altitude is also measured during this time period. A look-up table may be used to determine the efficiency for the particular model of engine and the Road Load Equation is solved to determine the weight. Although the initial implementation assumes that rolling resistance and aerodynamic drag are constant during the time period, this information may also be derived from a time period in the sortie where the acceleration is zero on flat terrain.

After determining load weight (step 119a), the module determines operating characteristics (step 119b). In this step, the module looks at environmental factors associated with the segment being traversed such as wind speed, temperature, traffic, and/or road terrain. Information regarding the segment may be included on the sortie profile. For example, the sortie profile may include information describing the condition of each segment of the sortie, including, the environment (e.g., urban, suburban, rural, long-haul, combat, enforcement, patrol, or training) along with corresponding performance thresholds. The sortie profile may also include, for a given segment of the route of travel, information regarding the slope (e.g. grade), state and/or characteristics of relevant infrastructure, government traffic controls (e.g., speed limits, stop signs, traffic lights), volume of traffic, or weather conditions (e.g., temperature, wind, barometric pressure, precipitation). The information for the sortie profile may come from historical data (e.g. topographic maps, speed limit databases, etc.) or real-time data feeds (e.g. current weather, traffic, etc.)

If the vehicle's speed is greater than a predetermined speed threshold value (step 320, "Yes"), the fuel used during the time frame is attributed to the excessive speed category in the fuel-use log (step 322).

If the vehicle's speed is not greater than the predetermined speed threshold value (step 320, "No"), the categorization module determines whether the engine speed is outside a predetermined range for the selected gear (step 330).

Next, the module determines the minimum horsepower and torque required to traverse the segment in question (step

123*a*). Here, the module may determine the minimum energy required to traverse the road segment. In particular, the module determines, based on, e.g., the Road Load equation described above, this minimum value by compensating for weight of the vehicle at the posted speed limit within the given environmental conditions. Minimum fuel consumption associated with the minimum horsepower and torque is then determined by the module (Step 124*a*) through, e.g., a lookup table which may include values of torque, engine RPM, and fuel rate.

If the engine speed is within the predetermined range for the selected gear (step 324, "Yes"), the categorization module determines whether the engine speed is in a predetermined fuel-efficient range for the selected gear (step 326). If so, the categorization module attributes the fuel used during the current time frame as "normal fuel use" (step 314) and stores fuel used in the fuel-use log in association with the attributed category. On the other hand, if the engine speed is not in the fuel-efficient range for the selected gear (step 326, "No"), the module attributes the amount of fuel used that is outside the efficient range to the gearing category and records the determination in the fuel-use log (step 328).

If the engine speed is outside the predetermined range for the selected gear (step 324, "No"), the categorization module determines whether the engine speed is outside the predetermined speed range for the selected gear. If so (step 330, "Yes"), the module attributes the fuel used in the time frame to fuel waste due to shifting loss (step 332).

Figure 2:
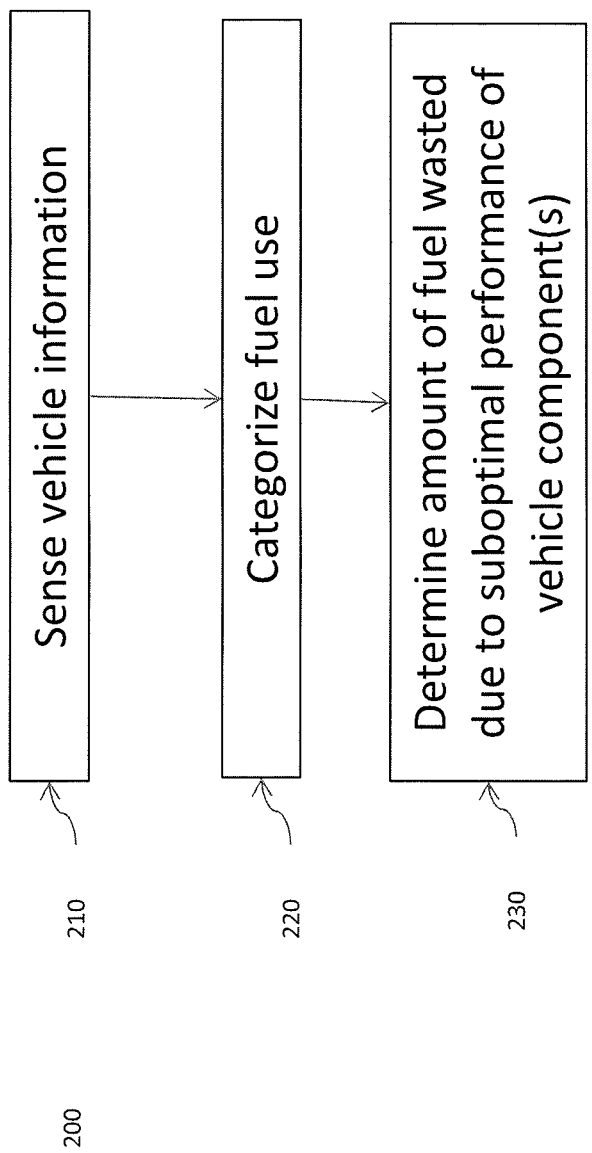
FIG. 2 is a flow diagram illustrating a method of determining an amount of fuel wasted due to suboptimal performance of vehicle component(s) in accordance with aspects of the present invention.

FIG. 2 depicts a flow diagram of steps of a process 200 of determining an amount of fuel wasted by a vehicle due to sub-optimal performance of at least one component of the vehicle according to aspects of the invention.

In step 210, information regarding the operation of the vehicle is sensed by at least one sensor positioned on the vehicle. In the exemplary system described above, the drive train sensors may sense fuel consumption by monitoring, e.g., detect engine speed (e.g., RPM), horsepower, torque, air flow, fuel flow, oxygen and idle speed. The drive train sensors may also preliminarily determine whether one or more components of the vehicle are performing at a suboptimal level resulting in fuel waste. For example, the drive train sensors may sense one or more improperly or degraded (i.e., not completely failed due to age or other suboptimal components) functioning components, including a faulty fuel delivery system (e.g. stuck fuel injector, worn fuel pump, etc.), emission control system (e.g. stuck exhaust gas recirculation valve, plugged diesel particulate filter, etc.), or a variety of other improperly functioning components that one of ordinary skill in the art would understand to have an impact on fuel efficiency.

In step 220, the fuel consumed is categorized as a normal fuel use or a wasted fuel use due to the at least one component performing at a sub-optimal level. One method by which to categorize the fuel use is by comparing the received information to manufacturer specifications and/or expected information from the at least one sensor, e.g., historical information obtained when the vehicle was operating at optimal or peak performance. In this regard, information about engine efficiency in given conditions may be stored onboard for later comparison.

In step 230, the amount of fuel wasted due to the at least one component operating at the sub-optimal level based on categorized fuel use is determined. For a given time period (e.g. sortie), the fuel wasted may be determined by totaling the fuel used for each time frame categorized as wasted in the time frames 0 to X.

In an alternative embodiment, performance information related to the vehicle is determined. The performance information is determined by comparing the amount of fuel wasted to the overall amount of fuel consumed by the vehicle. The performance information may include an overall amount of fuel wasted due to the one or more vehicle components functioning at a suboptimal level. The performance information may also include a new potential fuel economy (expressed in terms of, e.g., miles per gallon) if the component(s) performing at a suboptimal level are brought back into compliance.

The performance information may be presented to the operator and/or one or more others such as the operator's supervisor (or, in the case of autonomous, autonomous assist, semi-autonomous, or unmanned systems, via machine-to-machine communication). Further, the performance information may be presented visually or aurally, as described above with respect to the feedback module. The visual or aural cues may take the form of an indication that fuel is being wasted due to a component performing at a suboptimal level, the amount of fuel being wasted, and the identity of the component(s) causing the fuel waste. The performance information may also include a prompt that a particular component is coming due for maintenance, and that the failure to conduct such maintenance could result in the loss of fuel economy. The visual or aural cues may occur during or after the sortie.

The performance information may also be presented in the form of a report.

Figure 3:
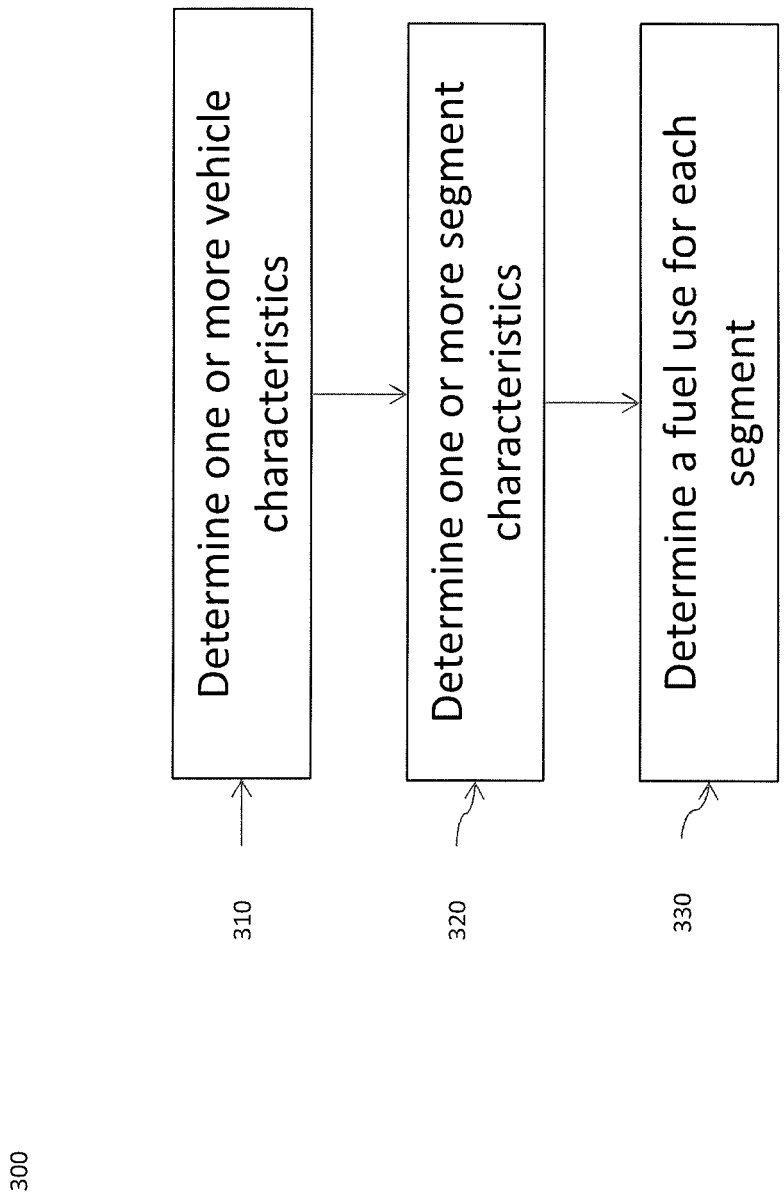
FIG. 3 is a flow diagram illustrating a method of determining fuel use of a vehicle for segments between a departure and a destination in accordance with aspects of the present invention.

FIG. 3 is a flow diagram of a method of determining fuel use of a vehicle for segments between a departure and a destination. In step 310, one or more vehicle characteristics of the vehicle are determined. The vehicle characteristics include, e.g., at least one of a vehicle profile or a vehicle load weight. Information regarding the vehicle profile may be acquired from the data storage device. Vehicle profile information may include, e.g., a vehicle type, a make, a model, vehicle options, vehicle age, defects, maintenance history and predetermined limitations (e.g., road speed limit). Information regarding the vehicle load may also be obtained from a data storage device including a sortie profile, or calculated using the method provided above. As described above, the sortie profile information may include a sortie type, a sortie description and a load description. Alternatively, the load weight of the vehicle may be determined based on a sensor, such as the drive train sensor, sensing the energy used during vehicle acceleration, while compensating for other factors such as rolling resistance, aerodynamic drag, and changes in elevation of the terrain.

In step 320, one or more segment characteristics of the segments between a departure and a destination are determined. Information regarding the segment may be included on the sortie profile. For example, the sortie profile may include information describing the condition of each segment of the sortie, including, the environment (e.g., urban, suburban, rural, long-haul, relevant infrastructure, combat, enforcement, patrol, or training) along with corresponding performance thresholds. The sortie profile may also include, for a given segment of the route of travel, information regarding the slope (e.g. grade), government traffic controls (e.g., speed limits, stop signs, traffic lights), volume of traffic, or weather conditions (e.g., temperature, wind, barometric pressure, precipitation). The information for the sortie profile may come from historical data (e.g. topographic maps, speed limit databases, etc.) or real-time data feeds (e.g. current weather, traffic, etc.).

In step 330, anticipated fuel use for each segment that may be traversed by the vehicle is determined. In one embodiment, the fuel use is a variable which is dependent upon both the vehicle characteristic(s) and the segment characteristic(s), which may be determined using a lookup table. The lookup table preferably includes a range of fuel economies which may be achieved by vehicles having certain characteristics traversing segments having certain characteristics. Values in the lookup table may be adjusted for, e.g., load and weather characteristics. The potential fuel economy, based on subtracting known waste as described above, may be expressed as MPG.

The fuel economy determined in step 330 may be presented to the operator and/or others such as the operator's supervisor.

In one embodiment, fuel use is determined for each of a plurality of segments. The plurality of segments may include some or all of the segments comprising one or more potential routes of travel.

Routes of travel may be divided into a plurality of segments. The length of each segment may be the same or it may vary among segments. One manner of determining the length of each segment is by reference to route of travel characteristics (e.g., at least one of road intersections, slope, government imposed traffic controls, volume of traffic, or weather conditions). Where a given route of travel characteristic, such as slope, varies greatly, smaller segment lengths may be desirable to increase the accuracy of the fuel economy determined for each segment. For example, a flat, 1 mile length of terrain having a constant speed limit may be one segment, while the next segment could be comprised of a 0.1 mile stretch of terrain having a 1% grade.

Figure 4A:
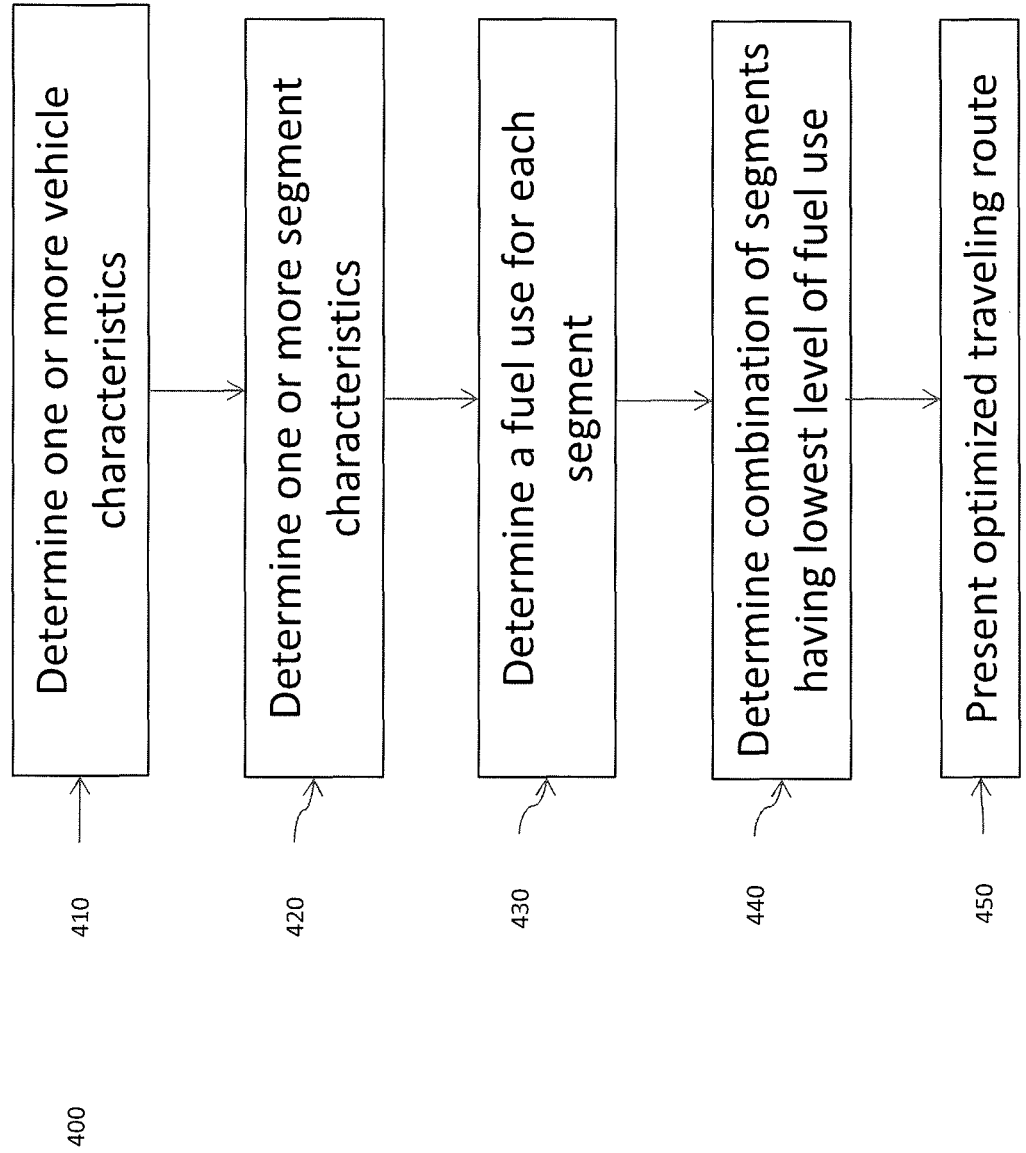
FIG. 4a is a flow diagram illustrating a method of optimizing a traveling route of a vehicle between a departure and a destination based on fuel consumption in accordance with aspects of the present invention.

Turning to FIG. 4a, a flow diagram for a method of optimizing a traveling route of a vehicle between a departure and a destination based on fuel consumption in accordance with aspects of the present invention is provided. In step 410, one or more vehicle characteristics are determined. As described above, the vehicle characteristics include, e.g., at least one of a vehicle profile or a vehicle load-weight.

Figure 5:
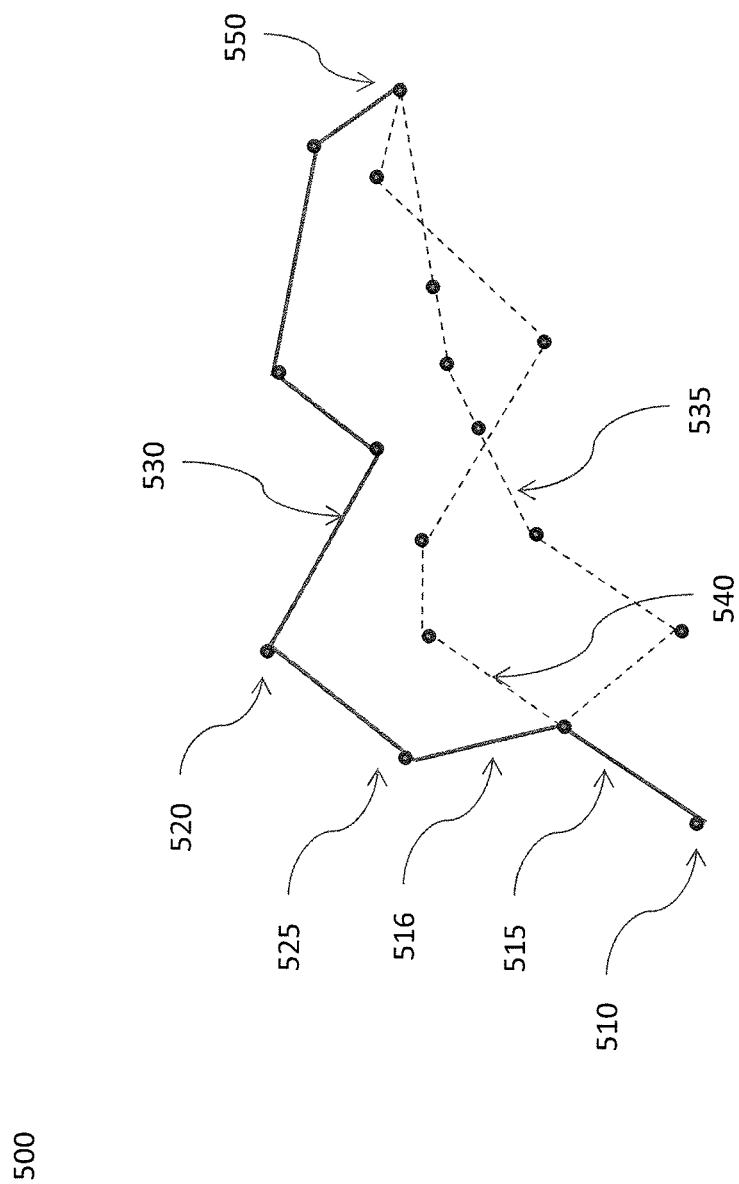
FIG. 5 is a diagram illustrating alternative routes of travel having multiple segments in accordance with aspects of the present invention.

In step 420, one or more segment characteristics for each of a plurality of identified segments between the departure and destination is determined. The plurality of segments may be identified based on ad hoc generated routes (such as those generated by an onboard global positioning system) or predefined routes (such as those stored by the sortie profile) between a given departure and destination. Each potential route of travel may be divided into a plurality of segments based on variations in route of travel characteristics as described above. For example, FIG. 5 depicts a plurality of segments, including segments 515 and 516, within three potential routes 530, 535, and 540. In this embodiment, each segment is defined by a line between two dots. Certain segments, such as segment 515 may fall within more than one potential route of travel.

Segment characteristic(s) (e.g., slope, government traffic controls, volume of traffic, or weather conditions) may then be determined for each of the identified segments.

In step 430, a fuel use may be determined for a portion or all of the identified segments. The fuel use for each segment may be identified using, e.g., the lookup table described above, based on the vehicle characteristics and the segment characteristics as inputs.

Figure 4B:
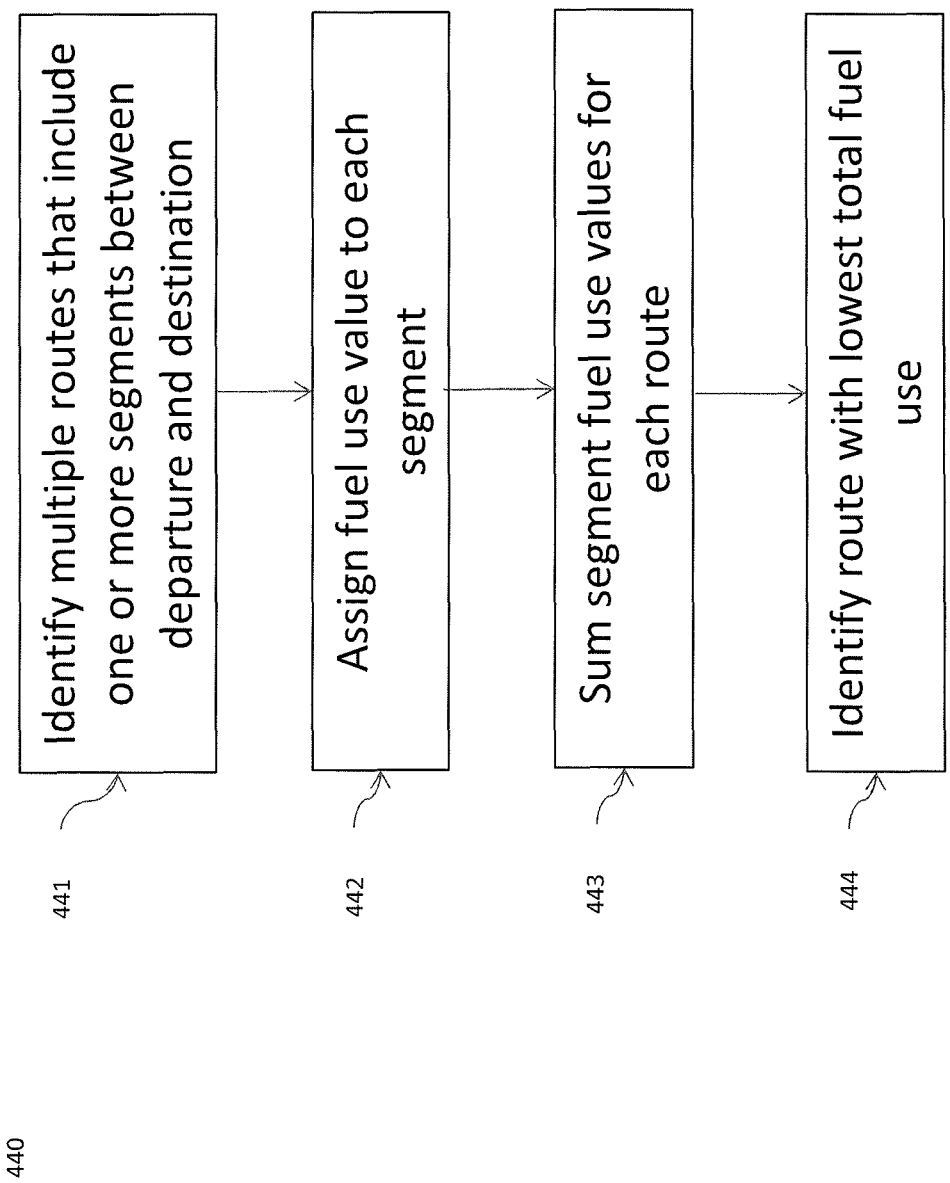

In step 440, the combination of segments resulting in a continuous path between the departure and the destination (i.e., a route of travel) which achieves the lowest level of fuel use is determined. Turning to FIG. 4b, step 440 is more fully described. In step 441, multiple routes of travel that include one or more segments between the departure and destination are identified. Fuel use values are assigned to each segment in step 442. For each combination of segments resulting in a continuous path between the departure and the destination, the fuel use values for each segment therein is summed in step 443. Then, in step 444, the route of travel having the combination of segments resulting in the lowest total fuel use is identified.

FIG. 5 illustrates multiple routes of travel 530, 535, and 540 between departure 510 and destination 550. Each route of travel includes a plurality of segments, such as segment 515. Route of travel 530 (shown with bolded segments) is identified in FIG. 5 as the route of travel resulting in the lowest total fuel use.

In an exemplary embodiment, alternative routes having low total fuel uses are also identified should the operator have a preference beyond fuel economy (such as travel time) among the identified routes. For example, each of the routes of travel 530, 535, and 540 could be presented to the operator, along with a projected fuel use for each.

The optimized travel route may also include information regarding making fuel efficient stops during the course of a sortie, e.g., at various waypoints such as rest stops. For example, rest stop 525, which is at the bottom of a large hill, may result in fuel waste over the course of a sortie as compared to a rest stop 520, which is at the top of the large hill. This is because it takes more horsepower and torque (and thus more fuel) to bring a truck (which stopped at the bottom of the hill) up to speed while climbing the large hill than it does for the same truck (which did not stop at the bottom of the hill) to maintain that speed. The optimized travel route may also take into consideration other obstacles such as route blockages caused by draw bridges or train crossing (which obstacles may be reported through IOT or which are known to have a certain probability of being up during a particular time of day).

The optimized travel route may be presented, in accordance with the methods described above, in step 450. The optimized travel route may be presented as, e.g., navigational instructions communicated to the operator of the vehicle during operation of the vehicle.

Figure 6:
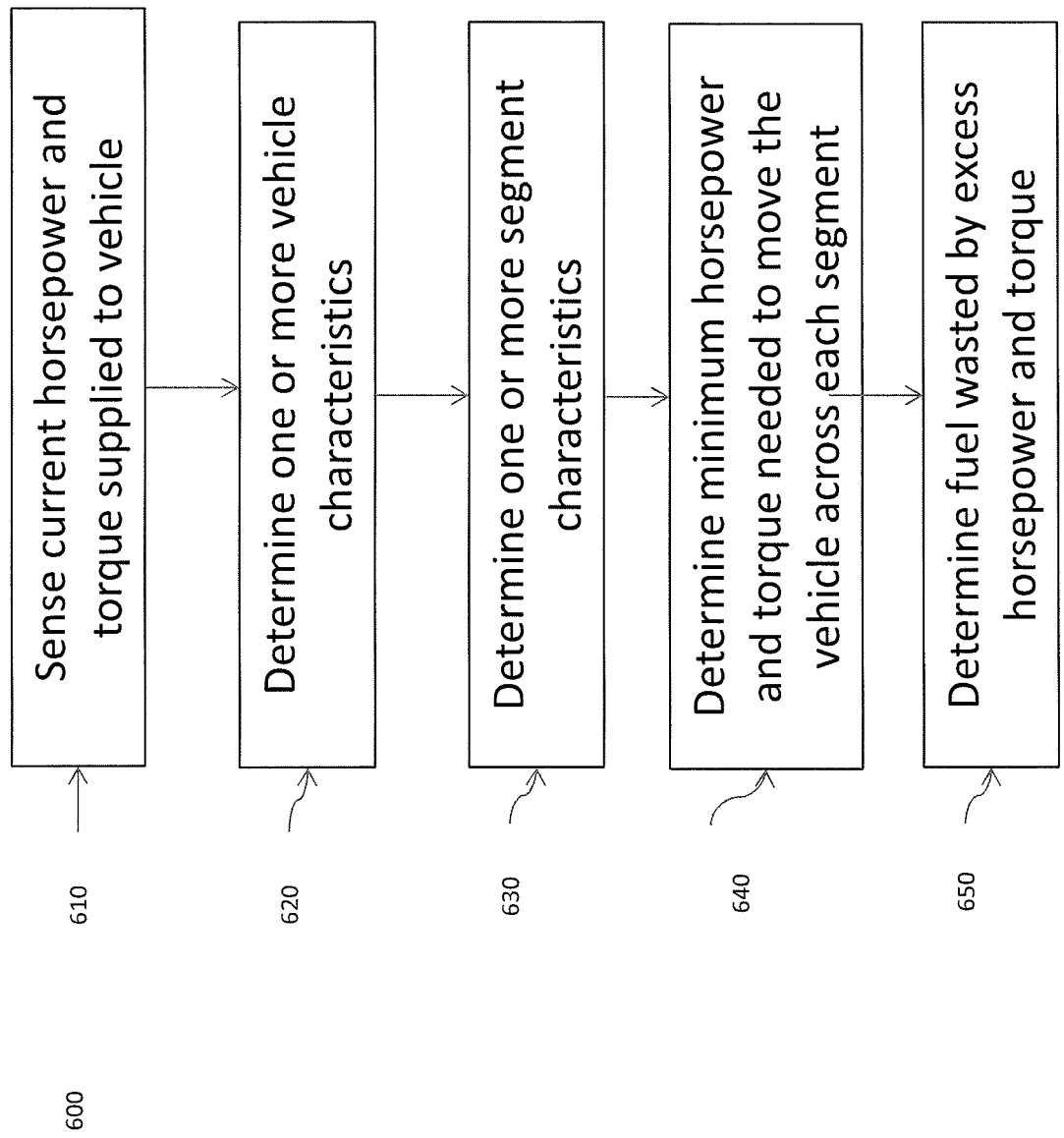
FIG. 6 is a flow diagram illustrating a method of determining fuel use associated with a minimum amount of horsepower and torque to move a vehicle across at least one segment of a traveling route in accordance with aspects of the present invention.

In an exemplary embodiment, presenting the route of travel is (e.g., the optimized route of travel) may include presenting information to the supervisor of the operator via back-end server. The supervisor of the operator may be a dispatcher in charge of assembling/coordinating sorties for the company. Turning to FIG. 6, a flow diagram depicting a method of determining fuel use associated with a minimum amount of horsepower and torque to move a vehicle across at least one segment of a traveling route in accordance with aspects of the present invention is provided. In step 610, information about the operation of a vehicle is sensed by at least one sensor position on the vehicle. The information may include a current amount of horsepower and torque sensed by, e.g., the drive train sensor.

In step 620, one or more vehicle characteristics of the vehicle are determined. As described above, the vehicle characteristics may include at least one of a vehicle profile or a vehicle load. Alternatively or in addition, vehicle load information may be determined directly from self-reporting freight.

In step 630, one or more segment characteristics are determined for a given segment in a route of travel.

In step 640, a minimum amount of horsepower and torque to move the vehicle across the at least one segment is determined. In one embodiment, the minimum amount of horsepower and torque is a variable which is dependent upon both the vehicle characteristic(s) and the segment characteristic(s), which may be determined using a lookup table. As described above, values in the lookup table may be adjusted for, e.g., load and weather characteristics. This determination may also include compensating for the vehicle weight while the vehicle is traveling at the posted speed limit within that particular segment. The lookup table preferably includes a range of minimum amount of horsepower and torque which associated with vehicles having certain characteristics traversing segments having certain characteristics. By supplying the vehicle characteristic(s) and the segment characteristic(s), the minimum amount of horsepower and torque may thus be determined from the lookup table. This determination can also provide a basis to assess how well the vehicle is matched to the proposed sortie.

In step 650, the amount of wasted fuel due to excess horsepower and torque beyond the determined minimum amount of horsepower and torque is determined. In one embodiment, this value is calculated based on the difference between the current and minimum amounts of horsepower and torque. In one embodiment, the fuel use associated with the minimum amount of horsepower and torque is determined through a lookup table which maps fuel use to torque and engine RPM. The fuel use associated with the minimum amount of horsepower and torque may then be subtracted from the overall fuel use to determine the amount of fuel wasted due to excess horsepower and torque.

In an alternative embodiment, performance information related to the vehicle is determined. The performance information is determined by comparing the amount of fuel wasted to the overall amount of fuel consumed by the vehicle. The performance information may include an overall amount of fuel wasted due to the excessive horsepower and torque. The performance information may also include a new potential fuel economy if the minimum amount of horsepower and torque is supplied by the operator.

The performance information may be presented to either or both of the operator and the operator's supervisor according to the methods described above.

Figure 7:
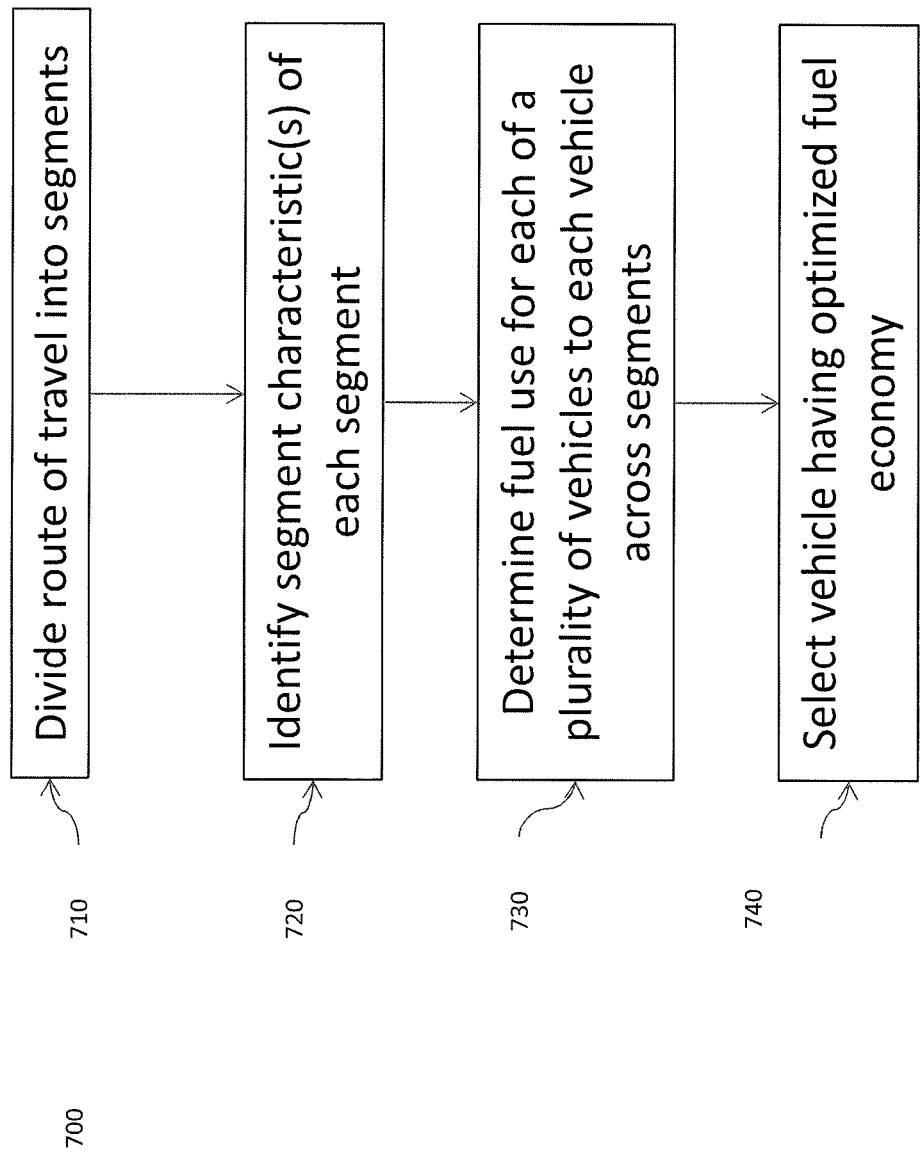
FIG. 7 is a flow diagram illustrating a method of selecting a vehicle for a route of travel in accordance with aspects of the present invention.

Turning to FIG. 7, a flow diagram depicting a method of selecting a vehicle for a route of travel in accordance with aspects of the present invention is provided.

In step 710, a route of travel is divided into a plurality of segments.

In step 720, one or more segment characteristics for each of a plurality of identified segments between the departure and destination is determined.

In step 730, a fuel use for each of a plurality of vehicles moving across the segments is determined, where the fuel use is dependent upon the segment characteristic. In one embodiment, the fuel use is a variable which is dependent upon both the vehicle characteristic(s) and the segment characteristic(s), which may be determined using a lookup table. The lookup table preferably includes a range of fuel uses which may be achieved by vehicles having certain characteristics traversing segments having certain characteristics. In this manner, a fuel use can be determined for each vehicle traversing each segment of the route of travel.

In step 740, the vehicle having a relative optimized fuel economy for the plurality of segments as compared to other vehicles of the plurality of vehicles is selected. For each vehicle in the plurality of vehicles, an overall fuel use may be determined by summing the fuel use by that vehicle for each segment of the route of travel. The vehicle having the lowest overall fuel use may be selected and, subsequently, presented.

In an exemplary embodiment, step 740 further includes selecting more than one vehicle having a relative optimized fuel economy. In this embodiment, each vehicle having a relative optimized fuel economy may be presented.

Figure 8:
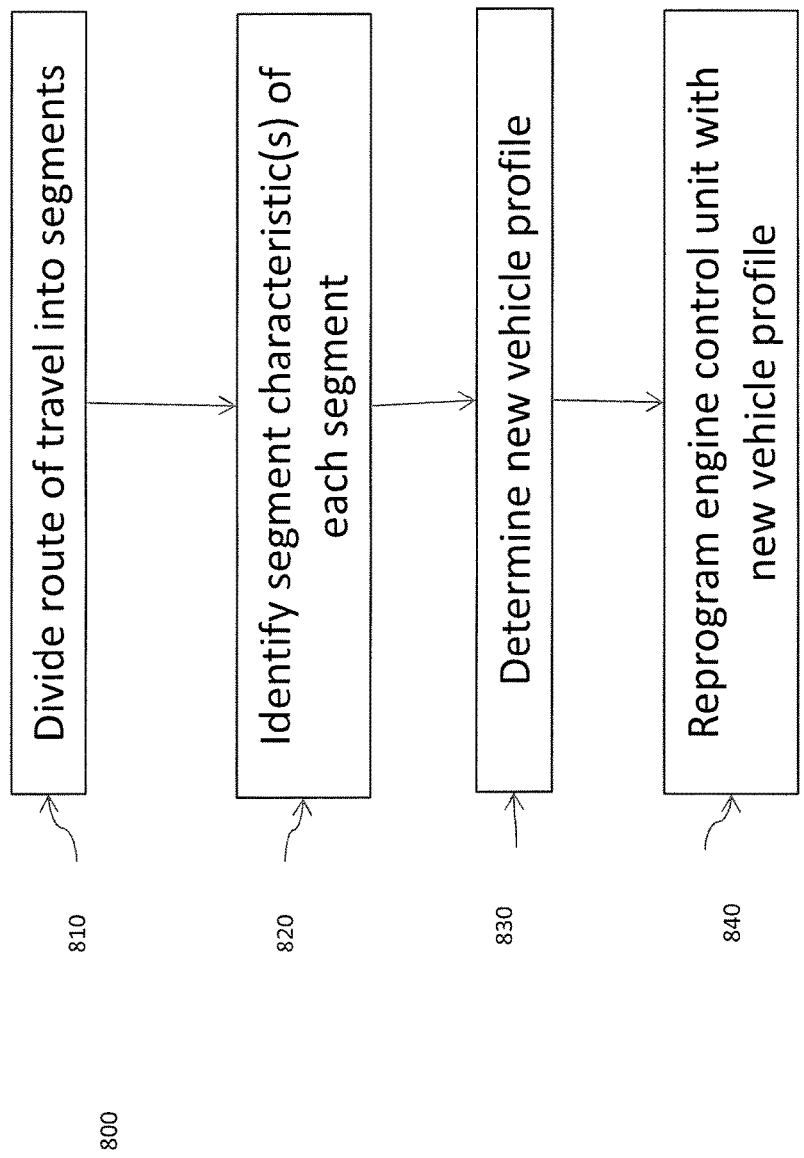
FIG. 8 is a flow diagram illustrating a method of optimizing a vehicle having an engine control unit for a route of travel in accordance with aspects of the present invention.

Turning to FIG. 8, a flow diagram depicting a method of optimizing a vehicle having an engine control unit ("ECU") for a route of travel in accordance with aspects of the present invention is provided. Generally, this method permits changing the performance of the vehicle by virtue of software loaded in the ECU. The ECU will have a first vehicle profile, i.e., the initial vehicle profile. The first vehicle profile may be the default vehicle profile, or it may be a vehicle profile based on a previous similar or identical sortie.

In step 810, a route of travel is divided into a plurality of segments.

In step 820, one or more segment characteristics for each of a plurality of identified segments between the departure and destination is determined.

In step 830, a second vehicle profile for the vehicle moving across the segments is determined. The second vehicle profile may be selected so as to result in a lower fuel use by the vehicle traversing the segment(s). The fuel use for the vehicle configured with the current vehicle profile may be determined through a lookup table. This lookup table preferably includes a range of fuel uses which may be achieved by specific vehicle profiles for vehicles traversing segments having certain characteristics. In this manner, a fuel use can be determined for a vehicle configured with the current vehicle profile while traversing each segment of the route of travel. In one embodiment, the second vehicle profile is also determined using a lookup table, which preferably includes a range of fuel uses which may be achieved by specific vehicle profiles for vehicles traversing segments having certain characteristics. Comparisons with previous similar or identical sorties may be desirable in determining and/or confirming the second vehicle profile. In this manner, a second vehicle profile can be determined for a vehicle such that, when the vehicle is configured with the second vehicle profile, it will consume less fuel while traversing each segment of the route of travel than the vehicle as configured with the current vehicle profile.

The second vehicle profile may also be selected based on location or environmental conditions. For example, the second vehicle profile may be selected so as to result in compliance with a posted speed limit. In this exemplary embodiment, the speed governor on the vehicle may be adjusted to match the posted speed limit for one or more of the segments of the route of travel. The ECU may also be reprogrammed to lower emissions when the vehicle enters a location that is subject to a smog advisory.

In step 840, the vehicle may be configured with the second vehicle profile by, e.g., reprogramming the ECU. For example, the vehicle profile may be changed by reprogramming the ECU to optimize fuel consumed by a vehicle while traversing segment(s) within a route of travel. Reprogramming may include changing the fuel/horsepower/torque map based on a load weight of the vehicle. The maximum available horsepower may be increased when the vehicle is heavily loaded or, conversely, decreased when carrying a lighter load. Reprogramming of this nature desirably prevents the operator from demanding more horsepower than would be required and would improve the overall fuel economy. One of ordinary skill in the art will understand from this disclosure that similar reprogramming may also be appropriate with respect to, e.g., segment terrain (flat vs. hilly, highway vs. city driving).

Figure 9:
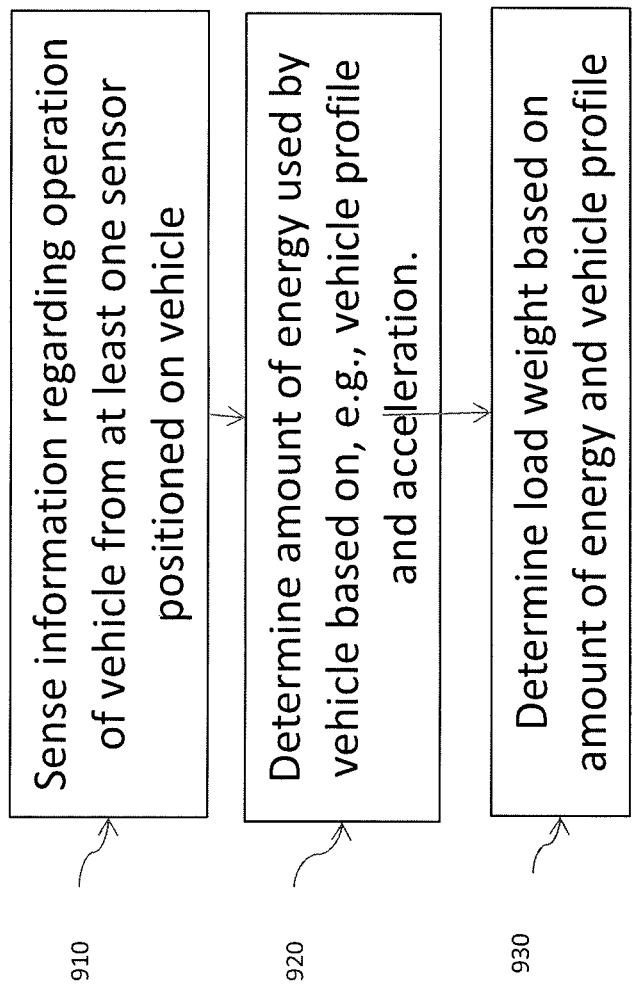
FIG. 9 is a flow diagram depicting a method of determining a load weight of a vehicle in accordance with aspects of the present invention.

Turning to FIG. 9, a flow diagram depicting a method of determining a load weight of a vehicle in accordance with aspects of the present invention is provided.

In step 910, information is sensed about the operation of the vehicle from at least one sensor positioned on the vehicle, the information including an acceleration of the vehicle.

In step 920, a processor determines an amount of energy used by the vehicle for the acceleration dependent upon a vehicle profile of the vehicle and the acceleration. According to one embodiment, the amount of energy used by the vehicle is determined by integrating the fuel flow rate over the time period, multiplied by the energy density of the fuel (which is, e.g., roughly 36.4 Mj/l for diesel fuel). The energy is multiplied by the efficiency of the powertrain (from the vehicle profile). This gives the energy required to cause the laden vehicle (i.e., the weight of the vehicle plus any freight and other encumbrances carried by the vehicle) to accelerate at the measured rate of acceleration over the change in altitude (which may be measured via GPS or other sensor or derived from terrain information in a database). From this calculation, the weight of the entire laden vehicle may be determined.

In step 930, a processor determines the load weight dependent upon the amount of energy and the vehicle profile. The load weight may be determined, in one embodiment, by subtracting the weight of the unladen vehicle (which information may be stored in the vehicle profile) from the weight of the entire laden vehicle obtained in step 920.

In one embodiment, the method further includes obtaining load information from one or more units of freight which actively or passively report load information. This information may be directly obtained from active and/or passive tags (RFID) which report the freight characteristics (including load) either through self-reporting or by being interrogated. The processor may use this load information as a cross reference or direct input in determining the overall load weight.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of optimizing a vehicle having an engine control unit programmed with a first vehicle profile for a route of travel comprising
    dividing a route of travel into a plurality of segments;
    identifying a segment characteristic of each of the plurality of segments;
    determining, with the processor, a second vehicle profile, the second vehicle profile dependent upon one or more of a fuel use and the segment characteristics; and
    reprogramming the engine control unit with the second vehicle profile.

2. The method of claim 1, wherein the segment characteristic is selected from the group consisting of a slope, distance, government imposed traffic controls, volume of traffic, and weather conditions.

3. The method of claim 1, wherein the first vehicle profile is associated with a first fuel use, and the determining step comprises determining the second vehicle profile dependent upon the fuel use, such that the fuel use of the second vehicle profile is less than the first fuel use for one or more of the plurality of segments.

4. The method of claim 2, wherein the segment characteristic is a government imposed traffic control, and the determining step comprises determining the second vehicle profile dependent upon the government imposed traffic control.

5. The method of claim 1, wherein the identifying step further comprises identifying one or more additional segment characteristics.

\* \* \* \* \*